US009275135B2

United States Patent
De et al.

(10) Patent No.: US 9,275,135 B2
(45) Date of Patent: Mar. 1, 2016

(54) ANNOTATING ENTITIES USING CROSS-DOCUMENT SIGNALS

(75) Inventors: Sushovan De, Tempe, AZ (US); Amit K. Singh, East Mumbai (IN); Karthik Visweswariah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 13/482,177

(22) Filed: May 29, 2012

(65) Prior Publication Data

US 2013/0326325 A1 Dec. 5, 2013

(51) Int. Cl.
*G06F 17/00* (2006.01)
*G06F 17/30* (2006.01)

(52) U.S. Cl.
CPC .................................. *G06F 17/3071* (2013.01)

(58) Field of Classification Search
CPC .............. G06F 17/241; G06F 3/04883; G06F 17/30867; G06F 17/30722; G06F 17/3071; G06F 17/30707; G06F 17/30705; G06F 17/30699; G06F 17/30663; G06Q 10/10
USPC ........... 704/4, 8, 9, 10; 706/46, 47, 56; 707/1, 707/2, 3, 4, 5, 7, 23, 737, 740; 715/200, 715/230
See application file for complete search history.

(56) References Cited

U.S. PATENT DOCUMENTS

| | | | |
|---|---|---|---|
| 6,363,379 B1 * | 3/2002 | Jacobson et al. | |
| 7,415,462 B2 * | 8/2008 | Bradford | |
| 7,451,135 B2 * | 11/2008 | Goldman et al. | |
| 7,496,561 B2 * | 2/2009 | Caudill et al. | |
| 7,672,833 B2 * | 3/2010 | Blume et al. | 704/10 |
| 7,716,194 B2 | 5/2010 | Williams et al. | |
| 7,734,623 B2 * | 6/2010 | Witbrock et al. | 707/723 |
| 7,870,118 B2 * | 1/2011 | Jiang et al. | 707/706 |
| 7,937,386 B2 | 5/2011 | Barrett et al. | |
| 8,046,360 B2 | 10/2011 | Tiyyagura | |
| 8,645,393 B1 * | 2/2014 | Kolak et al. | 707/748 |
| 8,725,771 B2 * | 5/2014 | Crochet et al. | 707/790 |
| 2004/0095376 A1 * | 5/2004 | Graham et al. | 345/716 |
| 2006/0123000 A1 | 6/2006 | Baxter et al. | |
| 2007/0067285 A1 | 3/2007 | Blume et al. | |
| 2007/0150802 A1 * | 6/2007 | Wan et al. | 715/512 |
| 2011/0106807 A1 | 5/2011 | Srihari et al. | |
| 2011/0131244 A1 | 6/2011 | Padovitz et al. | |
| 2012/0016877 A1 * | 1/2012 | Vadrevu et al. | 707/737 |
| 2012/0254188 A1 * | 10/2012 | Koperski et al. | 707/740 |

OTHER PUBLICATIONS

Bhole et al. Extracting named entities and relating them over time based on Wikipedia. Informatica 31 (2007) 463-468.
Sarawagi, Information extraction. FnT Databases, 1(3), 2008.

(Continued)

*Primary Examiner* — Scott Baderman
*Assistant Examiner* — Jason Edwards
(74) *Attorney, Agent, or Firm* — Ryan, Mason&Lewis, LLP

(57) ABSTRACT

An apparatus and an article of manufacture for annotating an entity in a document corpus using cross-document signals include determining which documents in a document corpus mention an entity of interest, clustering the documents that mention an entity of interest according to a temporal signal, a structural signal and/or a content signal, thereby forming at least one cluster of documents, and annotating at least one document in the at least one cluster of documents by marking each occurrence of the entity in the at least one document.

14 Claims, 6 Drawing Sheets

(56) References Cited

OTHER PUBLICATIONS

Milne et al. (2008) Learning to link with Wikipedia. In Proceedings of the ACM Conference on Information and Knowledge Management (CIKM'2008).

Bhattacharya et al. A Latent Dirichlet Model for Unsupervised Entity Resolution. Siam International Conference on Data Mining. 2006.

Bagga et al. A Methodology for Cross-Document Coreference. In Proceedings of the Fifth Joint Conference on Information Sciences (JCIS 2000).

Bagga et al. Cross-Document Event Coreference: Annotations, Experiments, and Observations. In Proc. ACL-99 Workshop on Coreference and Its Applications.

Bhattacharya et al. Deduplication and Group Detection Using Links. Proceedings of the 2004 ACM SIGKDD Workshop on Link Analysis and Group Detection.

Hasler et al. Do coreferential arguments make event mentions coreferential? Proceedings of the 7th Discourse Anaphora and Anaphor Resolution Colloquium (DAARC 2009), Goa, India, Nov. 5-6, 2009, pp. 151-163.

Chen. Graph-based Event Coreference Resolution. TextGraphs-4 Proceedings of the 2009 Workshop on Graph-based Methods for Natural Language Processing.

Getoor et al. Relational Clustering for Multi-type Entity Resolution. MRDM '05 Proceedings of the 4th international workshop on Multi-relational mining.

Bejan et al. Unsupervised Event Coreference Resolution with Rich Linguistic Features. ACL '10 Proceedings of the 48th Annual Meeting of the Association for Computational Linguistics.

\* cited by examiner

| Algorithm: AnnotateCorpus |
|---|
| input : A set of documents $D$, a dictionary of entities $E$, cluster similarity threshold $\delta$, document similarity weight $\alpha$ <br> output : A set of annotated documents $R$, and overall score $s$ <br> begin <br>    $R \leftarrow$ *FindPossibleMentions*$(D, E)$ <br>    $C \leftarrow$ *ClusterDocuments*$(R, \delta)$ <br>    $s \leftarrow 0$ <br>    foreach *Cluster* $c \in C$ do <br>      $s \leftarrow s +$ *AnnotateCluster*$(c, \alpha)$ <br>    return $R, s$ |

| Algorithm: FindPossibleMentions |
|---|
| input : A set of documents $D$, a dictionary of entities $E$ <br> output : Set of documents $R$, with possible locations of entities marked <br> begin <br>    foreach *Document* $d \in D$ do <br>      foreach *Entity* $c \in E$ do <br>        Mark each occurrence of $e$ in $d$ within a string-similarity threshold $\delta$ <br>    return $R$ |

Algorithm: ClusterDocuments input : A set of documents $R$, similarity threshold $\delta_{cluster}$
output : Set of clusters $C$
begin
  $sim \leftarrow \inf$
  while $(sim > \delta_{cluster})$ do
    $(d_1, d_2) = \arg\max \{similarity(d, d') | d, d' \in R\}$
    $sim \leftarrow similarity(d_1, d_2)$
    if $sim > \delta_{cluster}$ then
      $c \leftarrow d_1 \cup d_2$
      $R \leftarrow \{R \setminus \{d_1, d_2\} \cup c\}$
  return $R$

Algorithm: AnnotateCluster input : A cluster of documents $C$, a dictionary of entities $E$, document similarity weight $\alpha$
output : Annotated documents $A$, annotation score $s$
begin
  Set of mentions $M \leftarrow$ all mentions in $C$
  $V1$ : $x(i,j) \leftarrow 0, \forall i \in M, j \in E \cup NA, x \in \{0,1\}$
  $V2$ : $z(i,j,k) \leftarrow 0, \forall i, k \in M, j \in E$
  $C1$ : $\sum_j x(i,j) = 1$
  $C2$ : $s(i,j) = \sum_j x(i,j) \left\{ asim(i,j) + (1-\alpha) \sum_k \{sim(i,k) z(i,j,k)\} \right\}$
  $C3$ : $z(i,j,k) \leq x(i,j)$
  $C4$ : $z(i,j,k) \leq x(k,j)$
  $C5$ : $z(i,j,k) \geq x(i,j) + x(k,j) - 1$
  Solve integer linear program to maximize $\sum s(i,j)$, with variables $V1$, $V2$ and constraints $C1$ through $C5$
  Annotate every mention $i$ in $C$ with entity $j$ where $x(i,j) = 1$
  return $C, \sum s(i,j)$

---
Algorithm: LearnThresholds
---
input : training set of documents with labeled entities $D$
output : best similarity threshold for clustering $\delta$, best document similarity weight $\alpha$
begin
  $s_{best} \leftarrow 0$;
  $\delta_{best} \leftarrow 0$;
  $\alpha_{best} \leftarrow 0$;
  for $\delta = 0$, delta < 1, delta+ = $\varepsilon$ do
    for $\delta = 0$, delta < 1, delta+ = $\varepsilon$ do
      score = AnnotateCorpus($D$);
      if score > $s_{best}$ then
        $\delta_{best} \leftarrow \delta$;
        $\alpha_{best} \leftarrow \alpha$;
return $\delta, \alpha$

FIG. 8

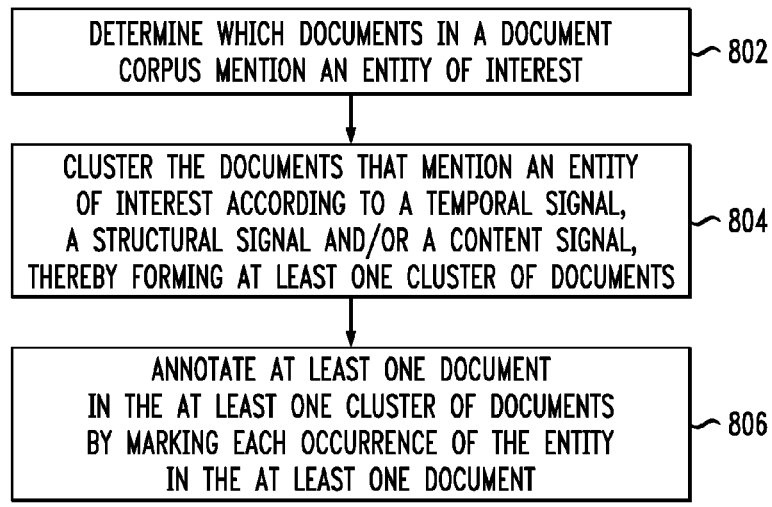

ANNOTATING ENTITIES USING CROSS-DOCUMENT SIGNALS

FIELD OF THE INVENTION

Embodiments of the invention generally relate to information technology, and, more particularly, to document annotation.

BACKGROUND

Searching for documents online can present challenges due to the increasing volume of documents available online. For example, "FSM" may refer to a city by the name of Fort Smith, the computer science concept of Finite State Machine, etc. Accordingly, while a user may be interested in documents pertaining to Finite State Machine, an online search for "FSM" may provide results directed to the city of Fort Smith. Existing approaches attempting to overcome this issue include entity disambiguation (annotation).

Existing approaches also include using signals within a document to solve the problem. However, signals from within the document may be insufficient to resolve the entity. Therefore, a need exists to annotate entities using signals across related documents for improved annotation, thereby making searching more efficient.

SUMMARY

In one aspect of the present invention, techniques for annotating entities using cross-document signals are provided. An exemplary computer-implemented method for annotating an entity in a document corpus using cross-document signals can include steps of determining which documents in a document corpus mention an entity of interest, clustering the documents that mention an entity of interest according to a temporal signal, a structural signal and/or a content signal, thereby forming at least one cluster of documents, and annotating at least one document in the at least one cluster of documents by marking each occurrence of the entity in the at least one document.

Another aspect of the invention includes a method for annotating an entity in a document corpus that includes processing each document in a corpus of documents obtained from at least one online source to identify which documents mention an entity of interest, using a description of the entity derived from a database to generate at least one context feature for the entity, processing each of the documents that mention the entity of interest by comparing text from each document with the at least one context feature and grouping the documents with a comparison similarity above a predetermined threshold into a cluster of documents, annotating at least one document in the cluster of documents by marking each occurrence of the entity in the at least one document, and outputting the at least one annotated document to a user.

Yet another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating an algorithm for annotating a document corpus, according to an embodiment of the invention;

FIG. 4 is a diagram illustrating an algorithm for finding possible entity mentions, according to an embodiment of the invention;

FIG. 5 is a diagram illustrating an algorithm for clustering documents, according to an embodiment of the invention;

FIG. 6 is a diagram illustrating an algorithm for annotating a cluster of documents, according to an embodiment of the invention;

FIG. 7 is a diagram illustrating an algorithm for learning thresholds, according to an embodiment of the invention;

FIG. 8 is a flow diagram illustrating techniques for annotating an entity in a document corpus using cross-document signals, according to an embodiment of the invention.

DETAILED DESCRIPTION

Figure 1:
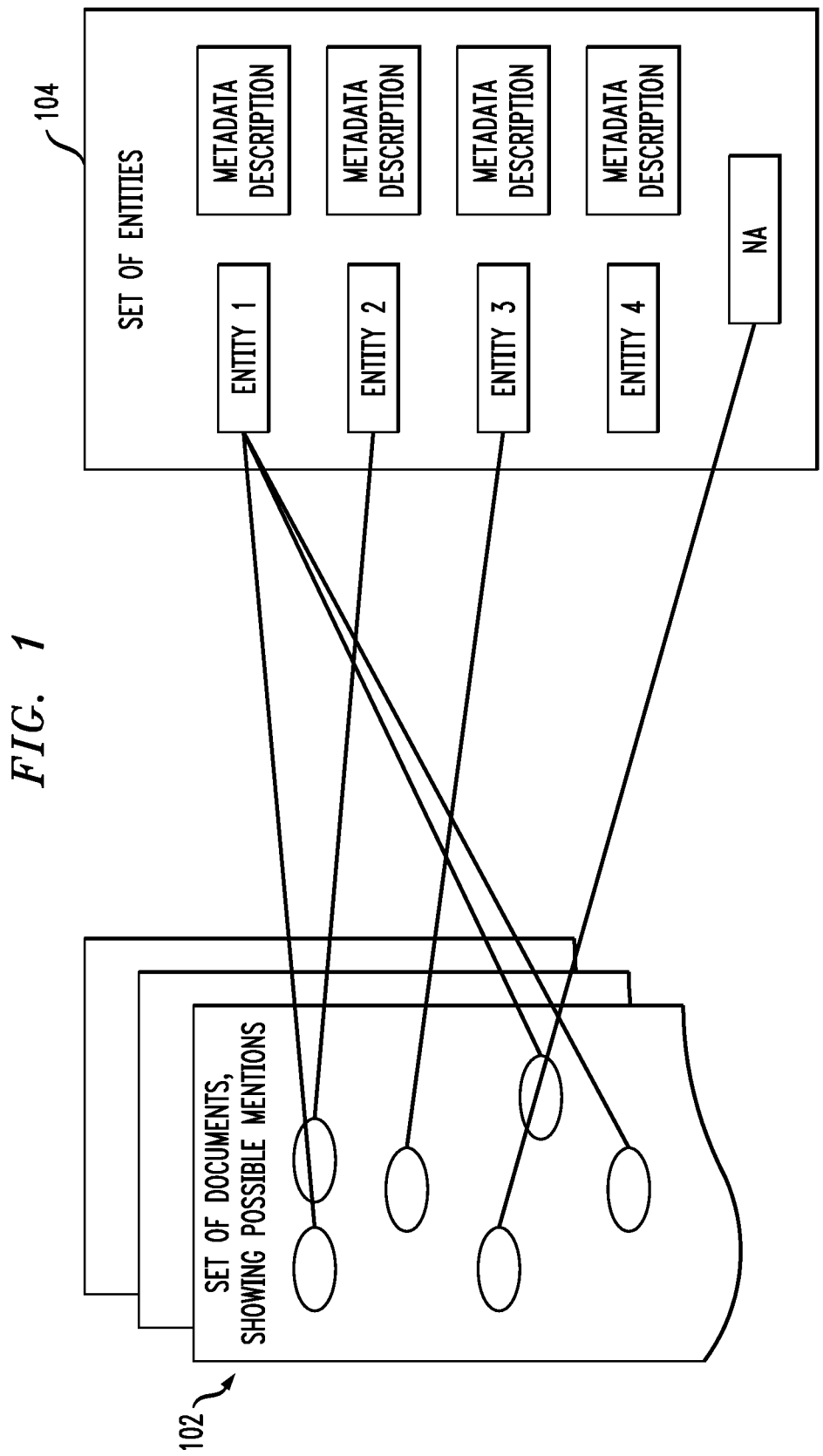
FIG. 1 is a diagram illustrating an example depiction of annotation determinations, according to an embodiment of the present invention.

As described herein, an aspect of the present invention includes annotating entities using cross-document signals. For instance, at least one embodiment of the invention includes using a signal with temporal, structural and/or content similarity constraints across multiple documents to extract entities. The temporal, structural and/or content signals are used to constrain which documents should be grouped together. Additionally, at least one embodiment of the invention includes using a dictionary of entities (types) and corresponding descriptions. Accordingly, as detailed herein, embodiments of the invention determine similarity between documents to collectively label mentions of a given entity.

In at least one embodiment of the invention, once documents have been grouped or clustered via use of the temporal, content and/or structural signals, an entity-to-context match and a document-to-document match are used in an optimization-based technique to assign an entity to one or more mentions.

As detailed herein, an entity-to-context match can be calculated, for example, as the cosine similarity between term frequency-inverse document frequency (TF-IDF) weighted word vectors corresponding to the context of the mention (a window can be formed around the mention) and the textual description associated with the entity. Similarly, a document-to-document match can be calculated, for example, as the cosine similarity between TF-IDF weighted word vectors corresponding to documents d1 and d2.

Exiting approaches disambiguate each mention in a document independently. To disambiguate among multiple possible entities, one approach includes using text similarity (such as TF-IDF) between the context of the mention and the description. For example, "Michael Jordan" can refer to multiple different people. However, presence of words such as "basketball" or "bulls" in the context of the mention increases the likelihood of the mention referencing the famous athlete.

In some instances, entities appearing in a document may not enjoy sufficient evidence. This might happen because of reasons such as: 1) the entity might be mentioned in passing (that is, not central to the general topic of document); and/or 2) the description associated with the entity might not be up-to-date to adequately capture the context (for example, a new event associated with the entity). By way of example, if an article is about the "Formula 1 competition in Montreal," then most of the in-document evidence is likely to be on the topic of sports. Hence, a mention of a musician in this document may not be annotated correctly (that is, as referred to herein, linked to NA). Accordingly, at least one embodiment of the invention includes deciding to link to NA, that is, opting out on an annotation when the confidence level corresponding to that annotation is not sufficiently high.

On the other hand, if an entire corpus of documents is considered, it may be more likely that additional documents referencing the same event but having more local evidence are found. Accordingly, at least one embodiment of the invention includes investigating if a signal can be propagated to other documents for improving entity annotations.

Further, as described herein, at least one embodiment of the invention can be implemented in a single document and single entity scenario, a single document and multiple entity scenario, a multiple documents and single entity scenario, as well as multiple documents and multiple entity scenario.

FIG. 1 is a diagram illustrating an example depiction of annotation determinations, according to an embodiment of the present invention. By way of illustration, FIG. 1 depicts a set of documents 102 showing possible mentions of an entity (or entities) of interest, as well as a set of entities 104 with a corresponding metadata description of each entity therein. Information contained within a metadata description of an entity may include entity type/topic, entity description, relation to other entities, relation between types, lexical forms in which the entity appears, attributes of the lexical forms, temporal profile of the entity, popularity of entity, etc. Given a set of documents such as 102 and a set of entities such as 104, embodiments of the invention can determine and locate mentions of those entities in the set of documents.

Figure 2:
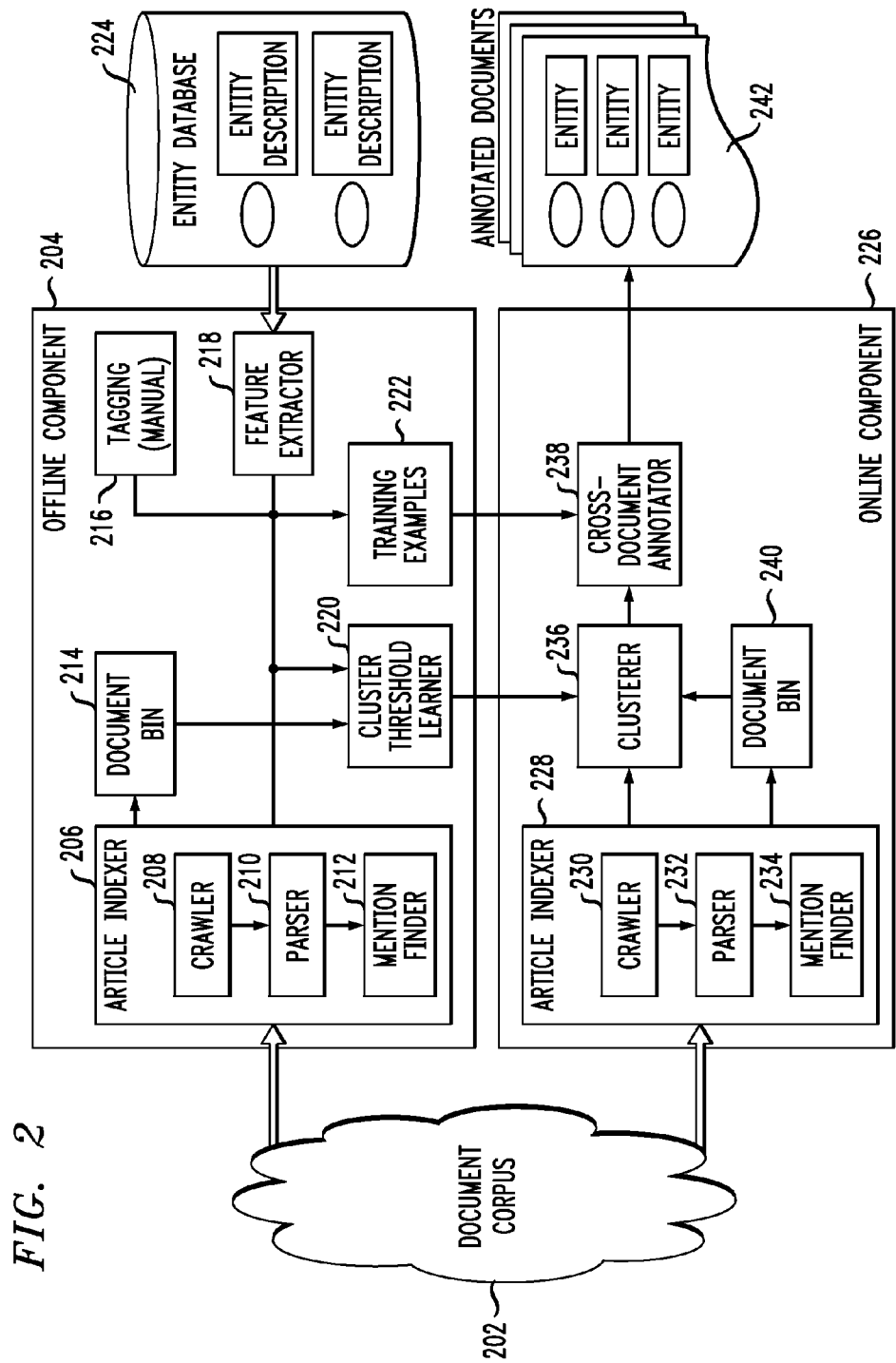
FIG. 2 is a block diagram illustrating an example embodiment, according to an aspect of the invention.

FIG. 2 is a block diagram illustrating an example embodiment, according to an aspect of the invention. By way of illustration, FIG. 2 depicts a document corpus 202, an offline component 204, an entity database 224 and an online component 226. Offline component 204 includes an article indexer component 206, which includes a crawler component 208, a parser component 210 and a mention finder component 212. Also, the offline component 204 additionally includes a document bin component 214, a tagging component 216, a feature extractor component 218, a cluster threshold learner component 220 and a training examples component 222.

As additionally depicted in FIG. 2, the online component 226 includes an article indexer component 228, which includes a crawler component 230, a parser component 232 and a mention finder component 234. Further, the online component 226 includes a clusterer component 236, a document bin component 240 and a cross-document annotator component 238, which ultimately outputs annotated documents 242.

As illustrated, component 202 represents a corpus of documents, which can be from the web or any other source. Article indexer component 206 processes each document in the corpus to find possible mention of entities. Also, in the offline component 204, a learning model is produced using training data. As depicted in FIG. 2, there can be two models, a cluster threshold learner 220 and a cross-document annotator model 238. The cluster threshold model 220 corresponds to the parameter that defines the extent of clustering. The cross-document annotator model 238 is the model that learns significance of various features/signals to perform inter-document annotation.

As also depicted in FIG. 2, feature extractor component 218 uses the entity metadata and context of a name mention inside the page in which it appears to construct features. Feature extractor component 238 can also learn the weight of such features.

Additionally, at run-time, all test pages undergo processing by the crawler component 230, parser component 232 and mention finder component 234. The parse component 232 extracts text and orthographic features from the page format, and the mention finder component 234 finds potential mention names. Also, the clustering component 236 is run on the set of these pages (documents), and the cluster threshold learnt from component 220 is applied to perform this clustering. Further, in each of the clusters obtained, cross-document annotator model 238 is applied to annotate entities and output annotated documents 242.

As also depicted in FIG. 2, document bins 214 and 240 are representations of documents where name mentions to be disambiguated are identified.

Additionally, at least one embodiment of the invention includes formulating the problem as an integer linear program as follows. A graph is created from a cluster of documents. The nodes of the graphs are the entity mentions. Edges are placed between all pairs of nodes that share a mention, and edge weight is equal to the similarity between the mentions. This could include document or entity similarity.

For every assignment of nodes to entities, at least one embodiment of the invention includes computing the score of the graph. Consider the following measures: $\alpha$=similarity (mention, entity). $(1-\alpha)$=similarity (mention, other mentions labeled with same entity).

Accordingly, $\alpha$ is the parameter that balances local versus global information. For example, consider three documents in a cluster, d1 d2 d3, with a corresponding entity mention (m1, m2, m3) as Jaguar. "Jaguar," in these documents, can mean any of the following:
Jaguar (the automobile),
Jaguar (animal),
Something else, or
NA (none of above).

Let y1, y2, y3 represent values assigned to m1, m2 and m3, respectively, and assume that each of y value can take any of the above four possibilities that "Jaguar" can represent. One approach includes taking one document at a time and finding y for a corresponding m using just the information in that document and entity metadata (for example, similarity between the document and entity description). Accordingly, if the document was directed to sports cars, then most likely "Jaguar" is used in the automobile sense of the word and refers to entity "Jaguar automobiles."

At least one embodiment of the invention includes using all of the documents that are similar; such a step can have a two-part objective: a local objective and a global objective. A local objective takes intra-document signals into account. A global objective takes signals from other documents (weighted by similarity between documents) only if the other documents represent the same sense of the term "jaguar." a controls the global versus local tradeoff (for example, how much consideration is put in global signals versus local signals). By way of example, if y3 corresponding to m3 is assigned as NA, then it indicated that there is not certainty as to what "jaguar" means in document d3 (which contains mention m3). Hence, that entry will not contribute towards global evidence.

As described herein, words (mentions) in a document are linked to an entity. Further, as detailed above, any mention that is assigned to NA has a global evidence=0 and does not participate in the global evidence calculation directly as a factor of document similarities. Further, the assignment that has the highest score for the graph is the correct or chosen assignment. Labeled mentions can propagate their score to similar nodes, thus helping determine entities in similar documents.

Additional variables and constraints, according to at least one embodiment of the invention, can include the following. Variable x(i,j) indicates a mention i being assigned to entity j. Also, variable sim(i,j) is the similarity of mention i to entity j, and variable sim(i,k) is the document similarity of mention i and mention k. With respect to constraints, the score of a mention is $$\sum_j x(i, j)sim(i, j) + \sum_k \sum_{j \neq NA} x(i, j)x(k, j)sim(i, k).$$

As noted above, an objective of at least one embodiment of the invention is to maximize the total score, as calculated by the equation in the previous sentence.

Additionally, at least one embodiment of the invention can include propagating a measure of confidence. For example, such a measure can include a score that equates to the sum of (similarity of a node to an entity) and (similarity of documents assigned to the same label).

FIG. 3 is a diagram illustrating an algorithm 302 for annotating a document corpus, according to an embodiment of the invention. This algorithm includes finding possible entity mentions in each document, clustering the corpus into sets of topically coherent documents, and applying a cluster development agent (CDA) over these clusters individually. A variety of known techniques for clustering can be used.

FIG. 4 is a diagram illustrating an algorithm 402 for finding possible entity mentions, according to an embodiment of the invention. For finding possible entity mentions, this algorithm includes processing each document to find which words and/or sequence of words correspond to an entity as well as finding possible disambiguations for the identified segment.

FIG. 5 is a diagram illustrating an algorithm 502 for clustering documents, according to an embodiment of the invention. This algorithm describes an example clustering algorithm that can, for instance, start with all documents belonging to a separate cluster, and continue merging clusters as long as a similarity between two clusters is greater than a pre-determined delta.

FIG. 6 is a diagram illustrating an algorithm 602 for annotating a cluster of documents, according to an embodiment of the invention. This algorithm includes an example solution using an integer linear programming (ILP) formulation of the problem with constrains c3, c4, and c5 that ensures that "only one" entity is assigned to a mention.

FIG. 7 is a diagram illustrating an algorithm 702 for learning thresholds, according to an embodiment of the invention. This algorithm includes a training procedure for learning thresholds. A grid search technique can be used to learn parameters such as a clustering threshold, delta and alpha, a local versus global tradeoff, etc.

FIG. 8 is a flow diagram illustrating techniques for annotating an entity in a document corpus using cross-document signals, according to an embodiment of the present invention. Step 802 includes determining which documents in a document corpus mention an entity of interest. The determining step can include using a dictionary of entities which can contain a description corresponding to each entity. Also, the determining step can include using an entity-to-context match and/or a document-to-document match to assign the entity to a mention.

Further, as described herein, at least one embodiment of the invention includes considering signals from multiple entities in each document as well as temporal and textual similarity to other documents in the corpus.

Step 804 includes clustering the documents that mention an entity of interest according to a temporal signal, a structural signal and/or a content signal, thereby forming at least one cluster of documents. A temporal signal corresponds to a situation in which a document is from the same time epoch as another document. Time epochs can be measured via at least one granularity (minutes, hours, days, weeks, months, etc.). Additionally, a structural signal corresponds to a situation in which a document is part of a larger document arrangement (an email in an email chain, posts in a discussion forum thread, comments on a news article, etc.).

Step 806 includes annotating at least one document in the at least one cluster of documents by marking each occurrence of the entity in the at least one document. Additionally, at least one embodiment of the invention includes marking an occurrence of the entity (for example, as NA) in the at least one document as not applicable, in order to opt out of an incorrect and/or uncertain annotation.

Further, at least one embodiment of the invention includes applying a model to each cluster that provides weights to features of a signal to guide said annotating.

The techniques depicted in FIG. 8 can also include calculating an annotation score for each entity mention inside a document inside a cluster. Additionally, at least one embodiment of the invention includes training a set of documents with labeled entities to determine a threshold for clustering documents and/or a document similarity weight.

As described herein, at least one embodiment of the invention includes annotating a single entity in a single document. Such an embodiment can include determining an entity-to-context match for a mention of the entity from the document in an entity database without considering a signal from other documents or other entities in the document. Additionally, at least one embodiment of the invention includes annotating multiple entities in a single document. Such an embodiment can include determining an entity-to-context match for each mention of the multiple entities from the document in an entity database without considering a signal from other documents.

Further, at least one embodiment of the invention includes annotating a single entity in multiple documents. Such an embodiment can include determining an entity-to-context match and/or a document-to-document match for a mention of the entity from the document in an entity database, taking into account similarity and temporal proximity to other documents without considering a signal from other entities in the document. Also, at least one embodiment of the invention includes annotating multiple entities in multiple documents. Such an embodiment can include considering signals from multiple entities in each document as well as temporal and textual similarity to other documents in the corpus.

Additionally, as detailed herein, at least one embodiment of the invention can include processing each document in a corpus of documents obtained from at least one online source to identify which documents mention an entity of interest, and using a description of the entity derived from a database to generate at least one context feature for the entity. Such an embodiment further includes processing each of the documents that mention the entity of interest by comparing text from each document with the at least one context feature and grouping the documents with a comparison similarity above a pre-determined threshold into a cluster of documents. Also, such an embodiment includes annotating at least one document in the cluster of documents by marking each occurrence of the entity in the at least one document, and outputting the at least one annotated document to a user.

The techniques depicted in FIG. 8 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 8 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 9:
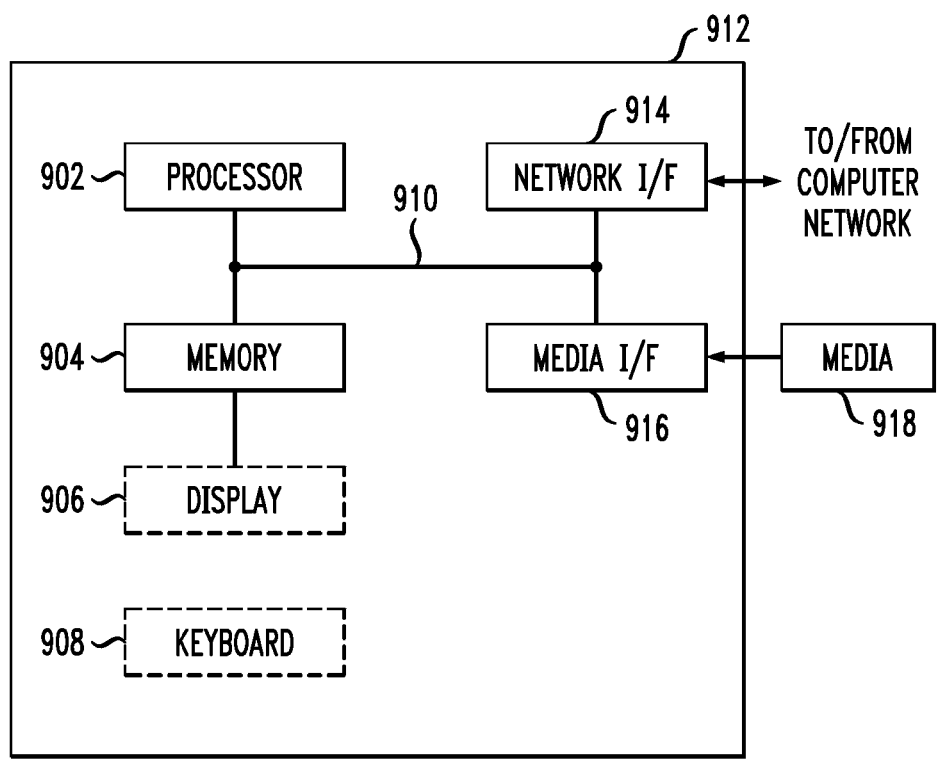
FIG. 9 is a system diagram of an exemplary computer system on which at least one embodiment of the invention can be implemented.

Additionally, an aspect of the present invention can make use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 902. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, using signals across documents to tag entities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An article of manufacture comprising a non-transitory computer readable storage medium having computer readable instructions tangibly embodied thereon which, when implemented, cause a computer to carry out a plurality of method steps comprising:
   determining which documents in a document corpus of multiple documents mention an entity of interest;
   clustering the documents that mention an entity of interest according to similarities across a temporal signal, a structural signal and a content signal, thereby forming multiple clusters of documents;
   annotating each document in the multiple clusters of documents with an annotation by marking each occurrence of the entity in each document;
   calculating a confidence measure for each occurrence of the entity in each document in each of the multiple clusters, wherein said confidence measure comprises the sum of (i) a measure of similarity between the given occurrence of the entity and the entity of interest, and (ii) a measure of similarity between the documents within the cluster of the given document via $$\sum_{j} x(i, j)sim(i, j) + \sum_{k} \sum_{j \neq NA} x(i, j)x(k, j)sim(i, k),$$

wherein x(i, j) indicates mention i being assigned to entity j, sim(i, j) indicates a similarity of mention i to entity j, sim(i, k) indicates a document similarity of mention i and mention k, and NA represents a non-applicable designation;
   creating a graph for each of the multiple clusters, wherein each of multiple nodes of each graph represents a mention of the entity of interest, and wherein said creating comprises placing an edge between each respective pair of nodes that share a mention, wherein an edge weight attributed to each edge is equal to the similarity between the shared mention;
   removing said annotation from one or more documents in the multiple clusters of documents by removing said marking for each occurrence of the entity in each document that corresponds to a confidence measure below a given value; and
   outputting (i) each annotated document and (ii) each created graph.

2. The article of manufacture of claim 1, wherein said determining comprises using a dictionary of entities.

3. The article of manufacture of claim 1, wherein the method steps comprise marking an occurrence of the entity in at least one document as not applicable, in order to opt out of at least one of an incorrect and an uncertain annotation.

4. The article of manufacture of claim 1, wherein the method steps comprise training a set of documents with labeled entities to determine a threshold for clustering documents and/or a document similarity weight.

5. The article of manufacture of claim 1, wherein the method steps comprise annotating a single entity in a single document.

6. The article of manufacture of claim 5, wherein the method steps comprise determining an entity-to-context match for a mention of the entity from the document in an entity database without considering a signal from other documents or other entities in the document.

7. The article of manufacture of claim 1, wherein the method steps comprise annotating multiple entities in a single document.

8. The article of manufacture of claim 7, wherein the method steps comprise determining an entity-to-context match for each mention of the multiple entities from the document in an entity database without considering a signal from other documents.

9. The article of manufacture of claim 1, wherein the method steps comprise annotating a single entity in multiple documents.

10. The article of manufacture of claim 9, wherein the method steps comprise determining at least one of an entity-to-context match and a document-to-document match for a mention of the entity from the document in an entity database, taking into account similarity and temporal proximity to other documents without considering a signal from other entities in the document.

11. The article of manufacture of claim 1, wherein the method steps comprise annotating multiple entities in multiple documents.

12. The article of manufacture of claim 11, wherein said determining includes considering signals from multiple entities in each document as well as temporal and textual similarity to other documents in the corpus.

13. A system for annotating an entity in a document corpus using cross-document signals, comprising:
   a memory; and
   at least one processor coupled to the memory and operative for:
      determining which documents in a document corpus of multiple documents mention an entity of interest;
      clustering the documents that mention an entity of interest according to similarities across a temporal signal, a structural signal and a content signal, thereby forming multiple clusters of documents;
      annotating each document in the multiple clusters of documents with an annotation by marking each occurrence of the entity in each document;
      calculating a confidence measure for each occurrence of the entity in each document in each of the multiple clusters, wherein said confidence measure comprises the sum of (i) a measure of similarity between the given occurrence of the entity and the entity of interest, and (ii) a measure of similarity between the documents within the cluster of the given document via $$\sum_j x(i, j) sim(i, j) + \sum_k \sum_{j \neq NA} x(i, j) x(k, j) sim(i, k),$$

wherein x(i, j) indicates mention i being assigned to entity j, sim(i, j) indicates a similarity of mention i to entity j, sim(i, k) indicates a document similarity of mention i and mention k, and NA represents a non-applicable designation;

creating a graph for each of the multiple clusters, wherein each of multiple nodes of each graph represents a mention of the entity of interest, and wherein said creating comprises placing an edge between each respective pair of nodes that share a mention, wherein an edge weight attributed to each edge is equal to the similarity between the shared mention;

removing said annotation from one or more documents in the multiple clusters of documents by removing said marking for each occurrence of the entity in each document that corresponds to a confidence measure below a given value; and outputting (i) each annotated document and (ii) each created graph.

14. An article of manufacture comprising a non-transitory computer readable storage medium having computer readable instructions tangibly embodied thereon which, when implemented, cause a computer to carry out a plurality of method steps comprising:

processing each document in a corpus of multiple documents obtained from at least one online source to identify which documents mention an entity of interest;

using a description of the entity derived from a database to generate at least one context feature for the entity;

processing each of the documents that mention the entity of interest by comparing text from each document with the at least one context feature and grouping the documents with a comparison similarity above a pre-determined threshold into a cluster of documents;

annotating each document in the cluster of documents with an annotation by marking each occurrence of the entity in each document;

calculating a confidence measure for each occurrence of the entity in each document in the cluster of documents, wherein said confidence measure comprises the sum of (i) the comparison similarity between the given occurrence of the entity and the entity of interest, (ii) a measure of similarity between the documents within the cluster of documents via $$\sum_j x(i, j) sim(i, j) + \sum_k \sum_{j \neq NA} x(i, j) x(k, j) sim(i, k),$$

wherein x(i, j) indicates mention i being assigned to entity j, sim(i, j) indicates a similarity of mention i to entity j, sim(i, k) indicates a document similarity of mention i and mention k, and NA represents a non-applicable designation;

creating a graph for the cluster of documents, wherein each of multiple nodes of the graph represents a mention of the entity of interest, and wherein said creating comprises placing an edge between each respective pair of nodes that share a mention, wherein an edge weight attributed to each edge is equal to the similarity between the shared mention;

removing said annotation from one or more documents in the cluster of documents by removing said marking for each occurrence of the entity in each document that corresponds to a confidence measure below a given value; and outputting (i) each annotated document and (ii) the created graph.

* * * * *